United States Patent [19]

Kester et al.

[11] Patent Number: 5,716,157
[45] Date of Patent: Feb. 10, 1998

[54] SYSTEM FOR HOLDING TOGETHER AND SEPARATING PARTS OF A CONSTRUCTION

[75] Inventors: Gerardus Joseph Kester, Vinkeveen; Christiaan Jilles Van Daalen, Zwaanshoek, both of Netherlands

[73] Assignee: Fokker Space & Systems B.V., Leiden, Netherlands

[21] Appl. No.: 568,322

[22] Filed: Dec. 6, 1995

[30] Foreign Application Priority Data

Dec. 14, 1994 [EP] European Pat. Off. ............ 94203630

[51] Int. Cl.$^6$ ................ F16B 1/00; B23H 7/00
[52] U.S. Cl. ................ 403/291; 403/28; 403/344; 403/2; 219/68
[58] Field of Search ................ 403/291, 2, 325, 403/322, 24, 338, 344, 28, 31, 32; 242/609, 609.1, 609.2, 609.3, 609.4; 219/200, 201, 68; 30/115, 116, 117; 83/15, 16; 244/173

[56] References Cited

U.S. PATENT DOCUMENTS

| | | | |
|---|---|---|---|
| 2,923,549 | 2/1960 | Hopper et al. | 219/68 X |
| 3,538,288 | 11/1970 | Freeman | 219/68 |
| 3,556,426 | 1/1971 | Jonkoping | 242/609.1 X |
| 3,924,688 | 12/1975 | Cooper et al. | 169/61 |
| 4,528,435 | 7/1985 | Billon-Pierron et al. | 219/68 X |
| 4,540,873 | 9/1985 | Kester . | |
| 5,129,753 | 7/1992 | Wesley et al. . | |
| 5,389,765 | 2/1995 | Baer | 219/670 X |
| 5,471,888 | 12/1995 | McCormick | 403/28 X |

FOREIGN PATENT DOCUMENTS

| | | | |
|---|---|---|---|
| 0059673 | 9/1982 | European Pat. Off. . | |
| 3615263 | 11/1987 | Germany | 244/173 |
| 1011680 | 12/1965 | United Kingdom . | |

Primary Examiner—Kenneth J. Dorner
Assistant Examiner—William L. Miller
Attorney, Agent, or Firm—Young & Thompson

[57] ABSTRACT

A system for holding together parts of a construction until the moment of separating the parts from each other, comprises at least two sections having abutting faces and tension element cooperating with supports, this tension element being provided on the sections holding the sections together under pre-tension. A breaker is provided for breaking the tension element so as to separate the sections. The tension element is wound around the supports forming a closed loop bundle that crosses the parting lines of the sections, whereby the strength of the bundle equals at least the pre-tension required to hold the sections together.

7 Claims, 4 Drawing Sheets

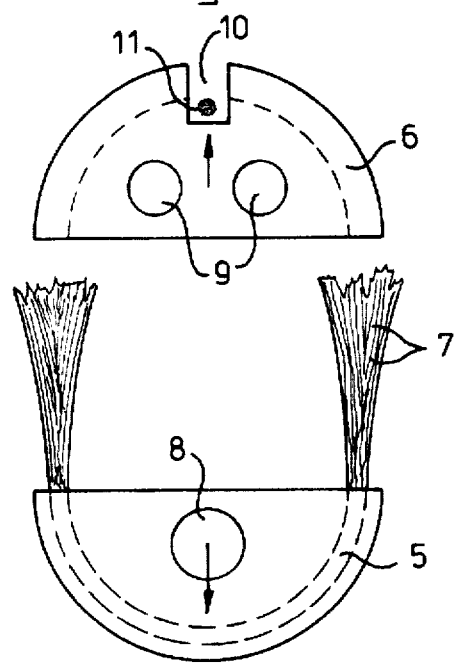
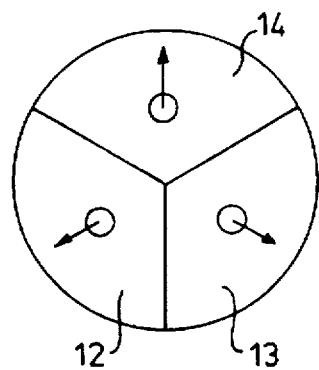
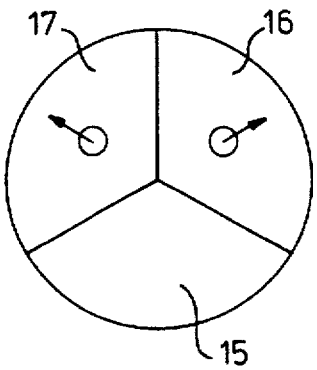
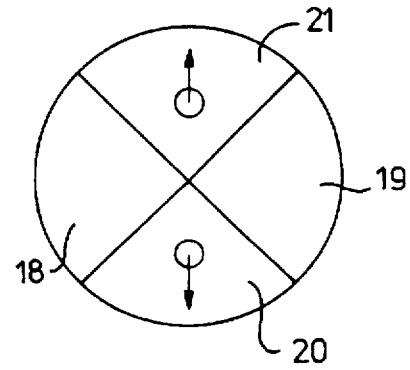
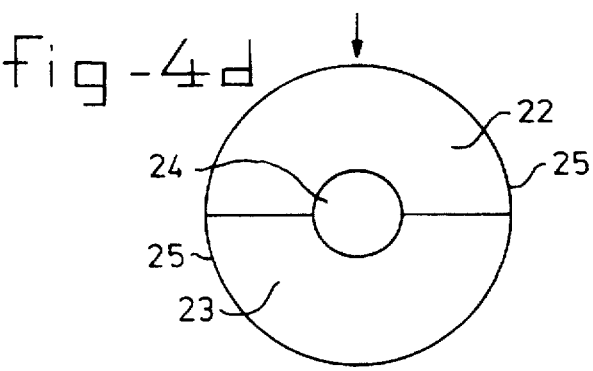

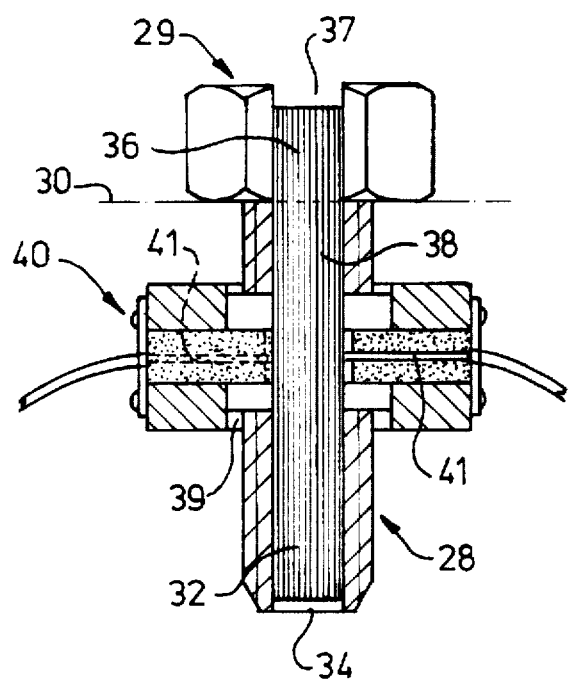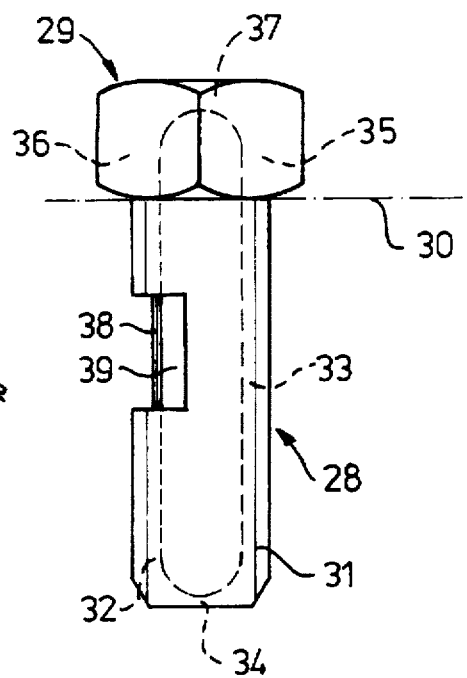

SYSTEM FOR HOLDING TOGETHER AND SEPARATING PARTS OF A CONSTRUCTION

BACKGROUND OF THE INVENTION

The invention relates to a system for holding together parts of a construction until the moment of separating these parts from each other, said system comprising at least two sections having abutting faces and a tension element cooperating with supporting means, provided on said sections holding said sections together under pre-tension, and breaking means for breaking said tension element so as to separate said sections.

Such systems are to hold two or more parts of a construction maintained in a predetermined position whereby the device includes a connecting element made of a material the strength of which will degrade under the influence of heat such that the element is able to break and in consequence thereof said parts are released.

Devices of this kind are used in releasable, deployable and/or foldable constructions especially in or on spacecrafts, such as solar panels, antennae, etc. thereof. By means of a connecting element the held or folded construction is maintained in the locked situation until the connecting element is broken, whereafter the construction is released and is able to deploy or is able to move away from the spacecraft. Such systems are also used for removable or rejectable covers on instruments on board of observation satellites.

DESCRIPTION OF THE PRIOR ART

It is known from the prior art of connecting elements holding for example deployable parts folded or separatable components together, that the working of such an element can be initiated by e mechanical cutting action, melting, charting or disruption by explosives. Prior art connecting elements and device to release or to break the connecting element presented in the patent literature include Kester U.S. Pat. No. 4,540,873, Buratynsky U.S. Pat. No. 5,286,150, Brandt et al. U.S. Pat. No. 3,698,281, Vaillant de Geulis EP patent 0,246,958 and Chenin et al. EP patent 0, 059,673.

U.S. Pat. No. 4,540,873 is describing i.e. an application whereby the parts to be released are hold in the folded or closed position by a single tensioned cable, whereby the diameter and material properties of the cable are determined by the tension in the cable resulting from loads exerted by the system to which the cable is coupled. The cable is made of a material, for example aramide fibres, that will not melt but char under influence of heat. In order to release the parts the cable is cut by local electrical heating of the cable.

U.S. Pat. No. 5,286,150 is describing an array of solar panels latched in the folded position by a cable. The cable comprises a hookable end whereby a device having a rotatable shaft with a hook is holding the loop at the end of the cable. By rotating the shaft the loop of the cable is freed from said hook whereupon the array of panels is released for deployment.

U.S. Pat. No. 3,698,281 is describing a connection between two parts comprising a structural element of which the core is holding an explosive. Upon detonation of the explosive the connection is disrupted and a separation of parts is effected.

Also EP-A-246,958 describes a connection method between two parts which connection can be separated by detonation a pyrotechnic device built-in in the connection. EP-A-59,673 is describing two parts hold together by a series of locking strips whereby the strips are interconnected by a single cable tensioned by a spring at the front end of the cable. A cable cutter is positioned at the back end of the cable. Said two parts are released from each other by tearing off the strips simultaneously, initiated by cutting the tensioned cable at its back end connection. The drawing of the patent shows that the cable is cut by a mechanical knife which may be driven by explosive energy.

A consequence of making use of a tensioned cable, as described in U.S. Pat. No. 4,540,873 and U.S. Pat. No. 5,286,150 to hold parts folded or hold parts in a fixed position, which cable has to be cut or otherwise unfastened in order to unfold or release said parts, is that the cable must be strong and stiff enough to hold said parts in the predetermined position during the launch of the spacecraft. The requirement for enough strength and stiffness of the connecting tensioned cable leads to the application, for a specific mission, of a specific cable size. In order to guarantee that the cable cutting device will be able to break the cable within a predetermined time, there will be a relationship between cable size and capacity of the cable cutter. A consequence of that relationship is that if for another mission the requirements for strength and stiffness are fulfilled by for example a tensioned cable having more mass, the cutting or releasing device has to be adapted to that cable.

Generally such adaption means a costly alteration. Such an adaption of the cable cutter is also the case when, for example, the number of clamps or strips holding said parts together is increased and in consequence of that the size of the tensioned cable is enlarged in order to have enough strength and stiffness to disconnect the parts.

SUMMARY OF THE INVENTION

The invention overcomes the problems of the prior art which require a re-sizing of the cable cutter in the case of re-sizing of the tensioned cable holding parts together.

An object of the present invention is to provide a system to hold two or more structural parts in a fixed position relative to each other, whereby the stiffness and strength of the connection between said parts have a predetermined value.

Another object of the invention is to provide a system holding two or more structural parts in a fixed position relative to each other whereby each part is connected to a section of the system and the sections are clamped together by a tensioned connection element, which system can be split into its two or more sections by breaking said connection element thus providing the disconnection of said two or more parts from each other.

Still another object of the present invention is to provide a system comprising two or more sections with abutting faces clamped to each other by a tensioned connection element, whereby the clamping force is adopted to the external load at the system such that the external load will not force the sections of the system apart.

Yet another object of the invention is to provide a system which will be divided into the sections thereof by breaking the connection element holding the sections clamped together, whereby the tensioned connection element is a wire or cable made of a polymer or glass material and the wire is broken by locally degradation of the mechanical properties of the polymer wire by electrical heat.

These objects are achieved in that said tension element is wound around said supporting means forming a closed loop bundle that crosses the parting lines of said sections, whereby the strength of the bundle equals at least the pre-tension required to hold said sections together.

BRIEF DESCRIPTION OF THE DRAWINGS

Some preferred embodiments will be discussed with reference to the figures.

FIG. 3 shows the system according to FIG. 2 after severing the threads.

FIGS. 4a–4d show alternative embodiments of the system according to FIGS. 2 and 3.

FIGS. 6a, 6b show a further variant.

DETAILED DESCRIPTION OF THE PREFERRED EMBODIMENTS

Figure 1:
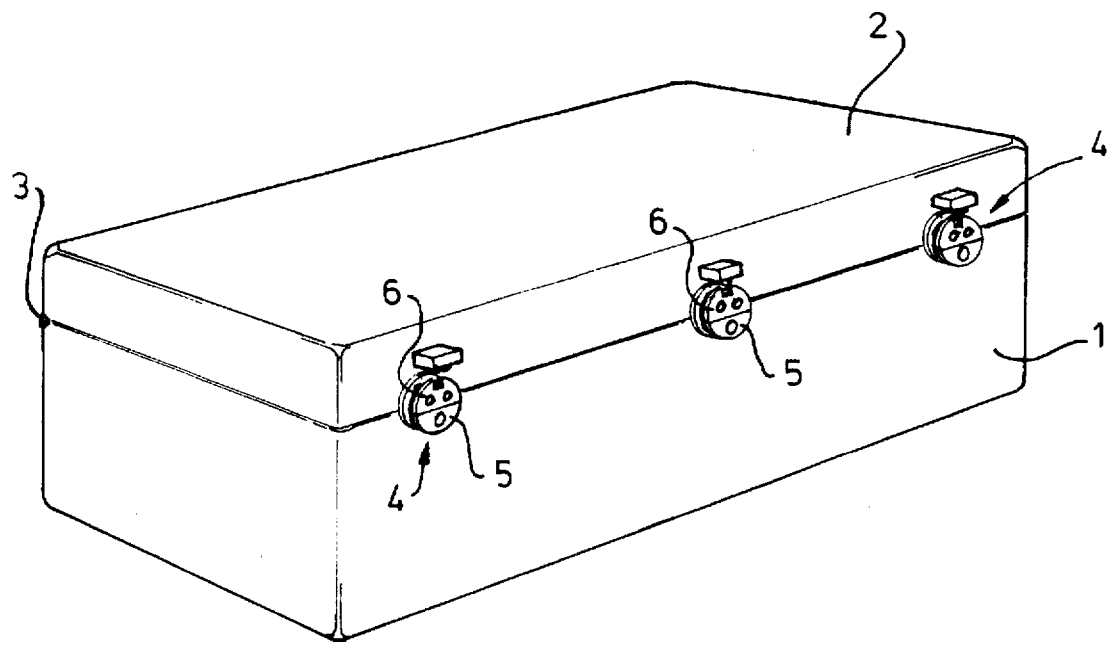
FIG. 1 shows a box provided with a system according to the invention.

The box shown in FIG. 1 has a container 1, as well as a lid 2 which is pivotable at hinge 3. Furthermore, the lid 2 is connected on the container 1 by means of the connecting systems 4 according to the invention. The box e.g. contains a solar panel for a satellite. Moreover, the lid is preloaded in the sense of opening by a mechanism not shown. This means that, upon freeing the connecting systems 4, the lid 2 swings open and the solar panel is able to become clear of the box and to unfold.

Figure 2:
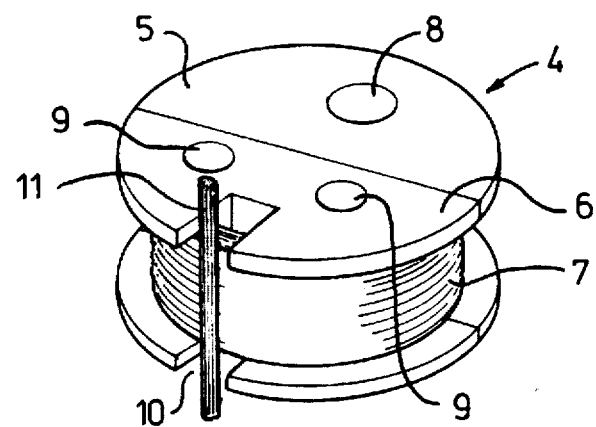
FIG. 2 shows a system according to the invention.

As shown in FIG. 2, the connecting system 4 is bobbin shaped, and comprises two sections 5, 6. The sections 5, 6 are held together by means of windings 7 of a wire or cable. Obviously, the more windings are applied, the stronger the connection between sections 5 and 6 becomes.

Both sections have holes 8 respectively 9, by means of which they are connected to the container 1 respectively to the lid 2.

Section 6 is provided with a radial gap 10, which is bridged by the windings 7. Above the gap, a heating wire 11 is situated. Upon heating said wire 11 and displacing into the gap 10, the windings 7 are cut leading to the situation shown in FIG. 3. As shown by the arrows in FIG. 3, the upper section 6 and lower section 5 move apart under the influence of the preloading on lid 2.

FIG. 4a shows an embodiment having three sections 12, 13, 14 which are held together by windings 7 (not shown). Upon cutting the windings 7, the three sections 12, 13, 14, which are each connected to a separate component, move apart.

FIG. 4b shows a variant having section 15, 16, 17, hold together by windings 7 as well. Here, section 15 is connected to a stationary component: section 16 and 17 move away after cutting the winding 7.

The embodiment of FIG. 4c has two sections 18, 19 connected to a stationary member, whereas sections 20 and 21, after cutting winding 7, move apart.

In the embodiment according to FIG. 4d the sections 22 and 23 enclose a central pin or bolt shaft 24. A tension element is wound around the supporting means 25 of the sections 22 and 23 forming a closed loop and holding the sections 22 and 23 together under pre-tension. Upon cutting through the tension element the central pin or shaft 24 is released. The embodiment may be at a shaft of a bolt. By splitting the nut as described, that which is hold affixed by the bolt-nut combination will be unfixed.

Figure 5A:
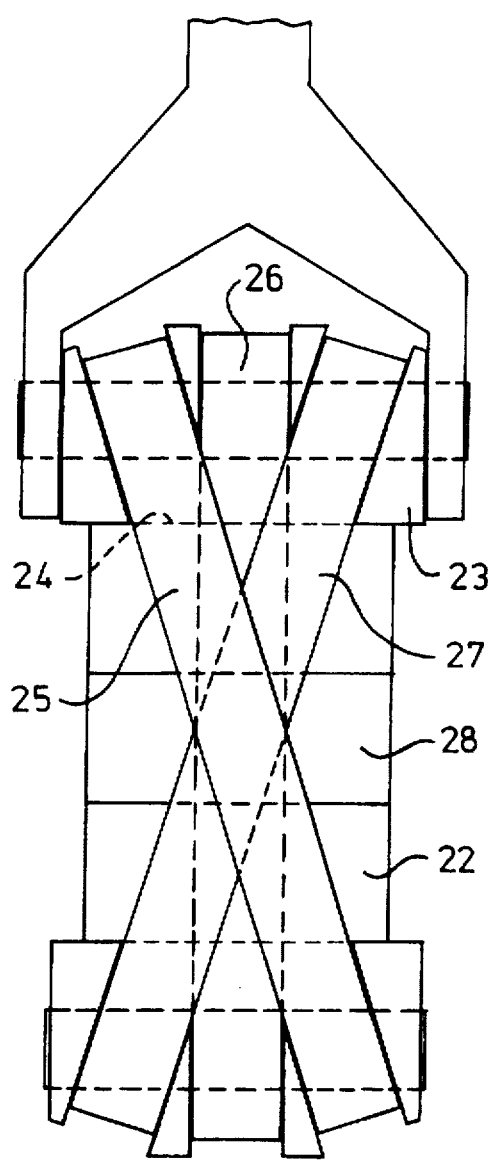
FIGS. 5a, 5b show a variant of the system according to the invention.
Figure 5B:
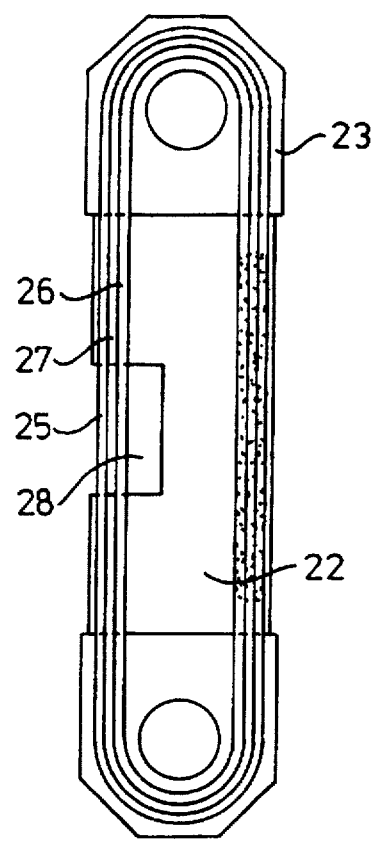

In the alternative embodiment according to FIGS. 5a end 5b, two sections 22, 23 are provided, which are separated along a line 24. Around these sections 22, 23, three sets 25, 26, 27 of windings of one and the same cable have been laid.

These sets 25, 26, 27 cross each other at the level of notch 28. By applying a heating wire above the notch 28 at the spots where the sets 25, 26, 27 cross each other, the windings can be cut through, leading to a release of sections 22 and 23.

The advantage of providing three sets 25, 26, 27 of windings is a resulting high holding strength of this connecting system.

A further advantage of crossing the windings of the cables is that the width of the tensioned element to be cut can be limited to a standard width adapted to the existing cable cutter.

In the embodiment according to FIGS. 6a and 6b, a bolt-like construction is shown comprising a bolt shaft 28 end bolt head 29 which are separated along line 30. Bolt shaft 28 is provided with external screw thread 31, two opposite longitudinal grooves 32, 33 and a diagonal groove 34.

Bolt head 29 has two opposite longitudinal grooves 35, 36 as well, together with a diagonal groove 37. Within grooves 32–37 in bolt shaft 28 and bolt head 29, a wire 38 is wound thus holding together these components under a required pretension.

Bolt shaft 28 also has a gap 39, which accommodates a heating wire construction 40 (only shown in FIG. 6a). Heating wire construction 40 has two heating wires 41 for cutting the windings of wire 38.

In this embodiment, the bolt comprising bolt shaft 28 and bolt head 29 assembled by means of wire 38 can be screwed into place, thus holding two respective parts of a construction together. Subsequently, via an intersecting hole tangent with respect to a screw threaded bore hole containing bolt shaft 28 in one of the construction parts, the heating wire construction is brought in position.

What is claimed is:

1. System for holding together parts of a construction until the moment of separating the parts from each other, said system comprising at least two sections having abutting faces and a tension element cooperating with supporting means of said sections, said section being provided with means for cooperation with said parts, said tension element being provided on said sections holding said sections together, and breaking means for breaking said tension element so as to separate said sections, said tension element being wound around said supporting means forming a closed loop bundle that crosses parting lines of said sections, whereby the strength of the bundle equals at least the tension required to hold said sections together.

2. The system according to claim 1, wherein said tension element, being a wire or strip made of a material of which the material properties will degrade under influence of heat, is wound to said bundle by parallel windings and said breaking means is aimed at at least one cross section of the bundle.

3. The system according to claim 2, wherein said tension element is made of a synthetic material.

4. The system according to claim 1, wherein said breaking means is an electrical cable cutter.

5. The system according to claim 1, wherein said tension element comprises plural layers of windings of a wire which degrade under the influence of heat.

6. The system of claim 5, wherein said breaking means comprises a heating element.

7. The system of claim 6, wherein said wire comprises one of a polymer and a glass material.

* * * * *